(12) United States Patent
Gvsl et al.

(10) Patent No.: US 11,436,440 B2
(45) Date of Patent: Sep. 6, 2022

(54) METHOD AND SYSTEM FOR DNN BASED IMAGING

(71) Applicant: SAMSUNG ELECTRONICS CO., LTD., Suwon-si (KR)

(72) Inventors: Tej Pratap Gvsl, Bangalore (IN); Vishal Keshav, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 16/423,774

(22) Filed: May 28, 2019

(65) Prior Publication Data

US 2019/0362190 A1 Nov. 28, 2019

(30) Foreign Application Priority Data

May 28, 2018 (IN) .............................. 201841019944

(51) Int. Cl.
| | |
|---|---|
| *G06K 9/62* | (2022.01) |
| *G06K 9/46* | (2006.01) |
| *G06K 9/72* | (2006.01) |
| *G06V 10/56* | (2022.01) |
| *G06V 30/262* | (2022.01) |

(52) U.S. Cl.
CPC ........... *G06K 9/6262* (2013.01); *G06K 9/629* (2013.01); *G06V 10/56* (2022.01); *G06V 30/274* (2022.01)

(58) Field of Classification Search
CPC .... G06K 9/6262; G06K 9/4652; G06K 9/629; G06K 9/726; G06K 9/38; G06K 9/4661; G06K 9/4628; G06T 2207/20084; G06T 5/00
See application file for complete search history.

(56) References Cited

U.S. PATENT DOCUMENTS

| | | | |
|---|---|---|---|
| 9,336,582 B1 | 5/2016 | Barron | |
| 9,858,292 B1* | 1/2018 | Setlur | ............... G06F 16/248 |
| 9,904,875 B2 | 2/2018 | Szegedy et al. | |
| 10,600,334 B1* | 3/2020 | Zhang | ............... G06K 9/00342 |
| 2003/0147558 A1* | 8/2003 | Loui | ............... G06K 9/6226 382/225 |
| 2007/0262985 A1* | 11/2007 | Watanabe | ............... G06T 5/008 345/420 |
| 2016/0055237 A1 | 2/2016 | Tuzel et al. | |
| 2017/0032222 A1* | 2/2017 | Sharma | ............... G06K 9/4619 |

(Continued)

OTHER PUBLICATIONS

Camille Couprie et al., "Indoor Semantic Segmentation using depth information", Mar. 14, 2013, 10 pages, Retrieved from URL: <https://arxiv.org/pdf/1301.3572.pdf>.

(Continued)

*Primary Examiner* — Ming Y Hon
(74) *Attorney, Agent, or Firm* — Sughrue Mion, PLLC

(57) ABSTRACT

Provided is a method of DNN-based image processing by an imaging device. The method comprises obtaining, by the imaging device, at least one input image with a plurality of color channels, simultaneously extracting, by the imaging device, a semantic information from each of the color channels of the at least one input image and a color correlation information from each of the color channels of the at least one input image, and generating, by the imaging device, at least one output image based on the extracted semantic information and the extracted color correlation information.

17 Claims, 19 Drawing Sheets

(56) References Cited

U.S. PATENT DOCUMENTS

| | | | |
|---|---|---|---|
| 2017/0069060 A1* | 3/2017 | Baqai | G06T 5/009 |
| 2017/0124717 A1* | 5/2017 | Baruch | G06T 7/194 |
| 2017/0270653 A1* | 9/2017 | Garnavi | G06N 20/20 |
| 2018/0089505 A1* | 3/2018 | El-Khamy | G06T 7/73 |
| 2018/0137406 A1 | 5/2018 | Howard et al. | |
| 2018/0231871 A1* | 8/2018 | Wang | G02B 27/0075 |
| 2018/0253839 A1* | 9/2018 | Zur | G06T 7/0012 |
| 2018/0350110 A1* | 12/2018 | Cho | G06T 9/004 |
| 2019/0000564 A1* | 1/2019 | Navab | G06T 7/521 |
| 2019/0019311 A1 | 1/2019 | Hu et al. | |
| 2019/0236411 A1* | 8/2019 | Zhu | G06K 9/6292 |
| 2019/0311202 A1* | 10/2019 | Lee | G06K 9/3233 |
| 2020/0065955 A1* | 2/2020 | Garlapati | G06K 9/6247 |
| 2020/0336699 A1* | 10/2020 | Kim | H04N 7/0117 |

OTHER PUBLICATIONS

Christopher Feichtenhofer et al., "Convolutional Two-Stream Network Fusion for Video Action Recognition", Sep. 26, 2016, 11 pages, Retrieved from URL: <https://arxiv.org/pdf/1604.06573.pdf>.

Andrew G. Howard et al., "MobileNets: Efficient Convolutional Neural Networks for Mobile Vision Applications", Apr. 17, 2017, Retrieved from URL: <https://arxiv.org/pdf/1704.04861.pdf>.

Vishal Keshav et al., "Decoupling Semantic Context and Color Correlation With Multi-Class Cross Branch Regularization", Dec. 9, 2018, 9 pages, Retrieved from URL: <https://arxiv.org/pdf/1810.07901.pdf>.

International Search Report (PCT/ISA/210) and Written Opinion (PCT/ISA/237) dated Sep. 6, 2019 issued by the International Searching Authority in International Application No. PCT/KR2019/006394.

Anonymous, "IEEE International Conference on Multimedia and Expo", Jul. 8-12, 2019, Retrieved from: (http://www.icme2019.org, (3 pages total).

Communication dated Apr. 13, 2021 issued by the European Patent Office in application No. 19810414.3.

Gharbi, M., et al., "Deep Bilateral Learning for Real-Time Image Enhancement", ACM Transactions on Graphics, vol. 36, No. 4, Article 118, Jul. 2017, XP058372892, pp. 1-12.

Yan, Z., et al., "Automatic Photo Adjustment Using Deep Neural Networks", ACM Transactions on Graphics, vol. 35, No. 2, Article 11, Feb. 2016, XP055790194, pp. 1-15.

Communication dated Dec. 14, 2020, issued by the India Intellectual Property Office in Indian Patent Application No. 201841019944.

* cited by examiner

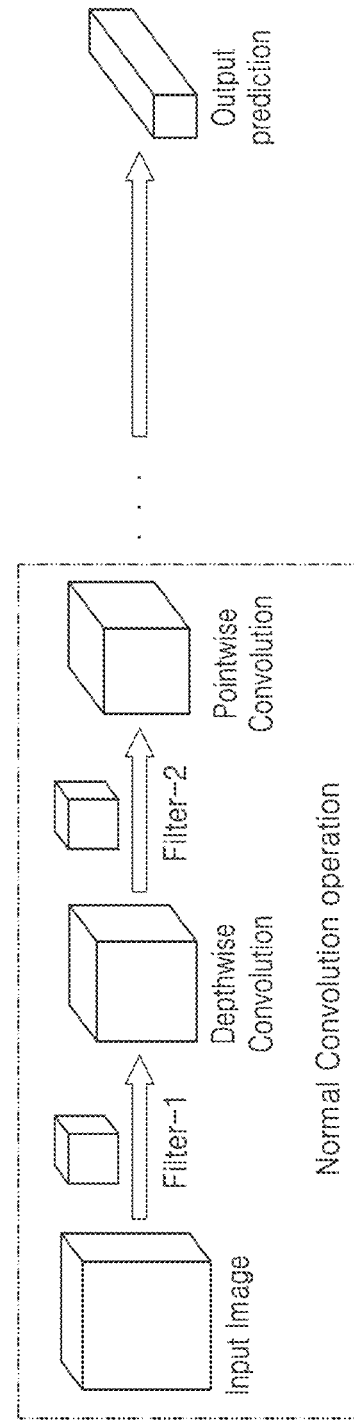

METHOD AND SYSTEM FOR DNN BASED IMAGING

CROSS-REFERENCE TO RELATED APPLICATIONS

The present application is based on, and claims priority under 35 U.S.C. 119 to an Indian Application Number 201841019944 filed on 28 May 2018, in the Indian Intellectual Property Office, the disclosure of which is herein incorporated by reference in its entirety.

BACKGROUND

1. Field

The disclosure relates to image processing and more specifically relates to a method and system for Deep Neural Network (DNN) based imaging.

2. Description of Related Art

It is essential to run complex image processing applications on a Mobile platform having limited computing capabilities. Existing lighter models such as MobileNet, ShuffleNet and the like for image classification and detection are invariant of colour information and hence are not suitable for complex vision tasks like low-light enhancement, denoising, de-hazing and the like. Further, the existing lighter models results in poor accuracy.

Existing heavier models (desktop based) makes re-use of existing AlexNet and SqueezeNet architectures to give comparable accuracy for vision applications, but are not suitable for computation on the mobile platform due to heavy memory and computational needs.

Further, existing DNN architectures (both mobile and desktop based) for imaging are not versatile. Different use cases of imaging need different DNN architecture which increases development and training time. Thus, using the existing DNN architecture is not energy efficient and not compatible with mobile device platform.

Further, there is an increasing demand to run Deep Convolution Neural Network (DCNN) based applications on mobile platforms for imaging. However the mobile platforms have limited computing and minimal storage capabilities. Thus it is necessary to have lightweight and faster and versatile models without negotiating on accuracy.

Color constancy is an essential block of the image processing pipeline and is inherently present in all vision based applications such as Auto White Balancing (AWB), semantic segmentation and classification and the like. State of the art methods for color constancy focuses on improving the accuracy but at the cost of inference time and memory footprint.

FIG. 1A is an example of the existing method with a neural network comprising plurality of convolution blocks for image processing. As seen in FIG. 1a the input image is passed through a filter 1 and then a first convolution is performed. This process continues for N number of convolution till the output prediction is generated. This conventional method has very high computational complexity due to convolution operation in each and every block.

FIG. 1B is an example of another conventional method with a neural network comprising decomposed convolution block for image processing. As seen in FIG. 1b the input image is passed through a filter 1 and then a depth-wise convolution followed by a point-wise convolution is performed. The conventional method may have low computation complexity per convolution operation but needs many layers to be added to get higher accuracy which effectively increases the computation time. Thus, is necessary to have lightweight and faster models without negotiating on accuracy.

Thus, it is desired to address the above mentioned disadvantages or other shortcomings or at least provide a useful alternative.

SUMMARY

Accordingly, the embodiments herein disclose a DNN-based image processing method for an imaging device. The method comprises obtaining, by the imaging device, at least one input image with a plurality of color channels. The method further comprises simultaneously extracting, by the imaging device, semantic information from each of the color channels, and color correlation information from each of the color channels of the at least one input image. The method further comprises generating, by the imaging device, at least one output image based on the extracted semantic information and the extracted color correlation information.

The method also comprises performing, by the imaging device, a channel-wise fusion of the semantic information and the color correlation information. In an embodiment extracting the semantic information and the color correlation information comprises extracting the semantic information and the color correlation information independently by using each separate neural network.

In an embodiment extracting the semantic information comprises extracting the semantic information by using Depth-Wise convolution.

In an embodiment extracting the color correlation information comprises extracting the color correlation information by using Point-Wise convolution.

In an embodiment performing the channel-wise fusion of the semantic information and the color correlation information further comprises fusing respective pixels of each of the channels from the semantic information and each of the channels from the color correlation information. The performing further includes generating, by the imaging device, learned maps between the semantic information and the color correlation information for each of the channels.

In an embodiment generating at least one output image based on the channel-wise fusion comprises generating predictions, by the imaging device, based on the channel-wise fusion of the semantic information and the color correlation information. The obtaining further comprises correcting, by the imaging device, the at least one input image based on the predicted values generated from the channel wise fusion operation and generating the at least one output image based on the correction.

Accordingly, the embodiments herein disclose an imaging device for DNN-based training comprising a memory, a communicator communicatively coupled to the memory and a processor coupled to the memory. The processor may be configured to receive at least one input image with a plurality of color channels. The processor may be further configured to simultaneously extract a semantic information from each of the color channels of the at least one image and a color correlation information from each of the color channels of the at least one image. The processor may be further configured to perform a channel-wise fusion of the semantic information and the color correlation information, and generate at least one out image based on the channel-wise fusion.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

This method and system is illustrated in the accompanying drawings, throughout which like reference letters indicate corresponding parts in the various figures. The embodiments herein will be better understood from the following description with reference to the drawings, in which:

FIG. 1B is a block diagram, illustrating the image processing, according to an embodiment as disclosed by the related art;

DETAILED DESCRIPTION OF DISCLOSURE

Figure 1A:
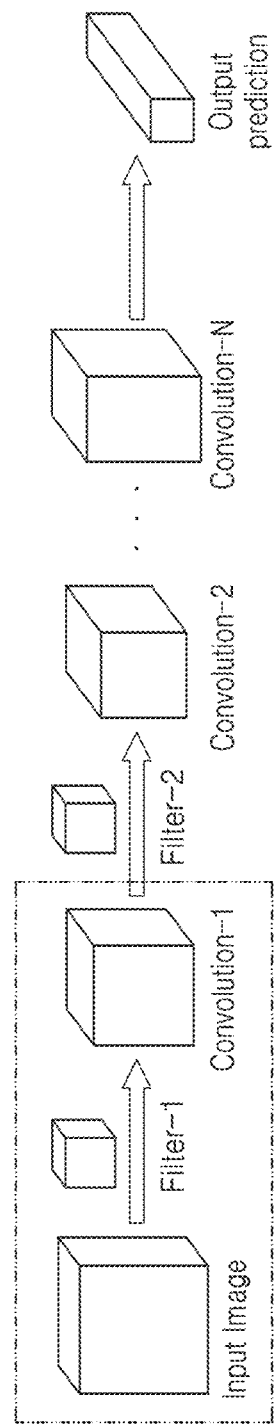
FIG. 1A is a block diagram, illustrating the image processing, according to an embodiment as disclosed by the related art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein disclose a method for DNN-based training method of an imaging device. The method may comprise receiving, by the imaging device, at least one input image with a plurality of color channels. The method may further comprise simultaneously extracting, by the imaging device a semantic information from each of the color channels of the at least one image using a depth-wise convolution, and a color correlation information from each of the color channels of the at least one image using a point-wise convolution. The method also comprises performing, by the imaging device, a channel-wise fusion of the semantic information and the color correlation information. The method may further include obtaining, by the imaging device, at least one output image based on the channel-wise fusion.

In an embodiment, a DNN-based training method for an imaging device is provided. In an embodiment, semantic information and color correlation information is simultaneously extracted from each color channels. In an embodiment, a channel-wise fusion of the semantic information and the color correlation information is performed. In an embodiment, at least one output image is obtained based on the channel-wise fusion.

In another embodiment, learned maps between the semantic information and the color correlation information for each of the channels is generated.

In another embodiment, an image component is predicted based on the channel-wise fusion of the semantic information and the color correlation information.

In another embodiment, the at least one input image is corrected based on the predicted image component.

Referring now to the drawings, and more particularly to FIG. 2-FIG. 10, where similar reference characters denote corresponding features consistently throughout the figures, there are shown preferred embodiments.

Figure 2:
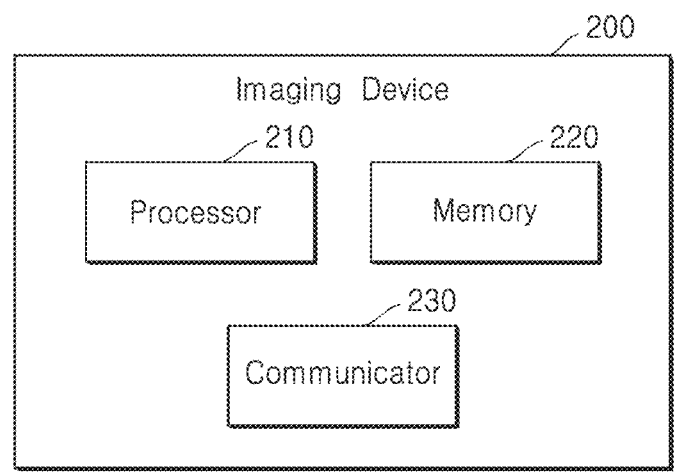
FIG. 2 is a block diagram, illustrating the imaging device for DNN-based training, according to an embodiment.

FIG. 2 is a block diagram of the imaging device 200, for DNN-based training, according to the embodiments as disclosed herein. The imaging device 200 can be, for example but not limited to, a cellular phone, a tablet, a smart phone, a laptop, a Personal Digital Assistant (PDA), a global positioning system, a multimedia device, a video device, an internet of things (IoT) device, smart watch, a game console, or the like. The imaging device 200 may also be referred to by those skilled in the art as a mobile station, a subscriber station, a mobile unit, a subscriber unit, a wireless unit, a remote unit, a mobile device, a wireless device, a wireless communications device, a mobile subscriber station, an access terminal, a mobile terminal, a wireless terminal, a remote terminal, a handset, a user agent, a mobile client, or the like.

In an embodiment, the imaging device 200 comprises a processor 210, a memory 220 and a communicator 230.

The processor 210 is configured to execute instructions stored in the memory 220 and to perform various processes. The processor 210 is further configured to receive input images with a plurality of color channels. The processor 220 is further configured to simultaneously extract a semantic information from each of the color channels of the input images using a depth-wise convolution, and a color correlation information from each of the color channels of the at least one image using a point-wise convolution. The processor 210 is further configured to perform a channel-wise fusion of the semantic information and the color correlation information, and obtain at least one output image based on the channel-wise fusion.

The communicator 230 is configured for communicating internally between internal hardware components and with external devices via one or more networks.

The memory 210 stores the effect and condition. The memory 1300 also stores instructions to be executed by the processor 210. The memory 1300 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 220 may, in some examples, be considered a non-transitory storage medium. The term "non-transitory" may indicate that the storage medium is not embodied in a carrier wave or a propagated signal. However, the term "non-transitory" should not be interpreted that the memory 220 is non-movable. In some examples, the memory 1300 can be configured to store larger amounts of information than the memory. In certain examples, a non-transitory storage medium may store data that can, over time, change (e.g., in Random Access Memory (RAM) or cache).

Although FIG. 2 shows various hardware components of the imaging device 200 but it is to be understood that other embodiments are not limited thereon. In other embodiments, the imaging device 200 may include less or more number of components. Further, the labels or names of the components are used only for illustrative purpose and does not limit the scope of the invention. One or more components can be combined together to perform same or substantially similar function to handle the PDCP operation in the wireless communication system.

Figure 3A:
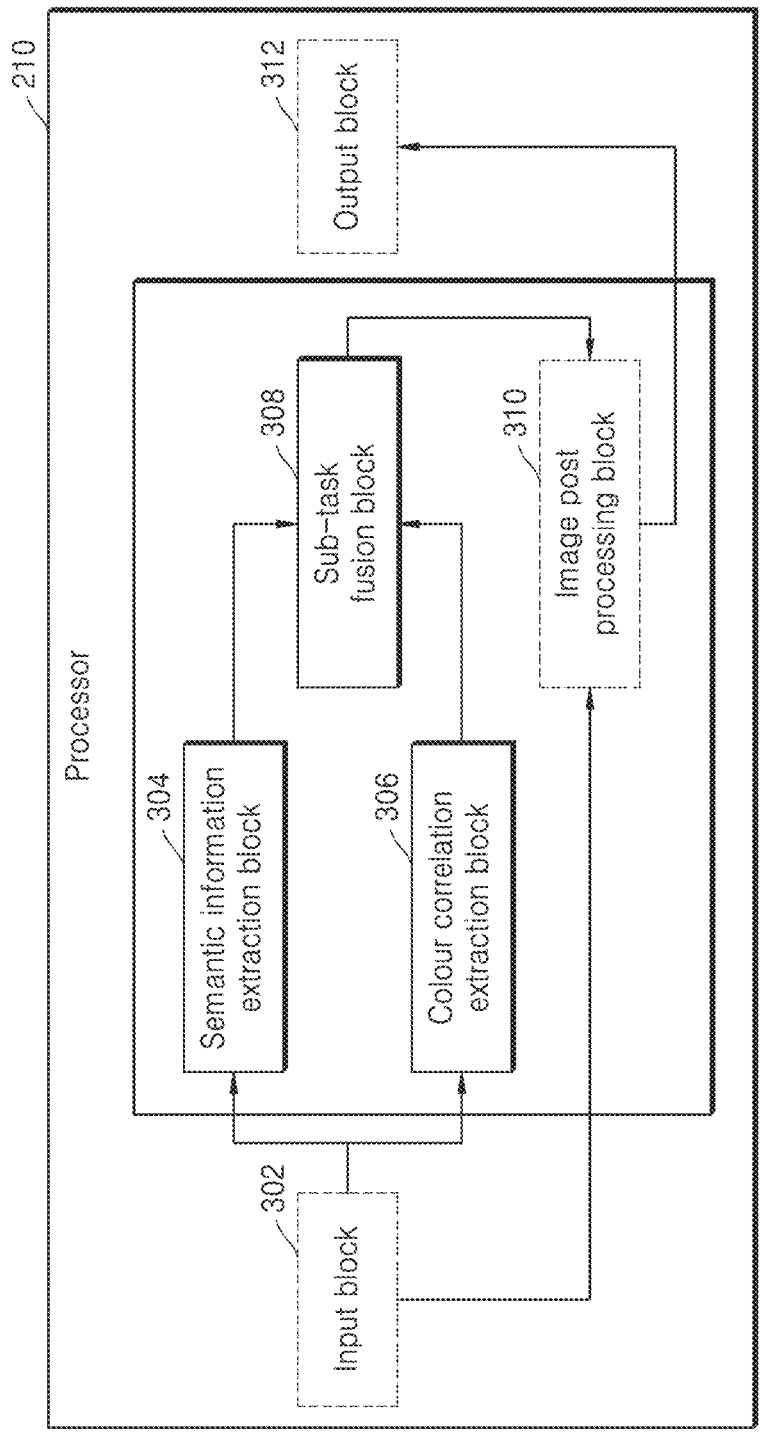
FIG. 3A is a block diagram of the processor for DNN-based training, according to embodiments.

FIG. 3A is a block diagram of the processor 210 for DNN-based imaging. As seen in FIG. 3A the processor 210 comprises an input block 302, a semantic information extraction block 304, a color correlation extraction block 306, a sub-task fusion block 308, an image post-processing block 310 and an output block 312. In an embodiment the input block 302, receives a plurality of input images. The input images comprise a number of color channels. In an example embodiment the color channels may be RGB channels.

After receiving the plurality of input images, the semantic information extraction block 304, and the color correlation extraction block 306 simultaneously performs a convolution operation on the input image. In an embodiment the semantic information extraction block 304 performs a depth-wise convolution operation on the plurality of channels of the input image. By performing the depth-wise convolution operation, semantic information is extracted from the plurality of color channels of the input image. In another embodiment the color correlation extraction block 306 performs a point-wise convolution operation on the plurality of channels of the input image. By performing the point-wise convolution operation, color correlation information is extracted from the plurality of color channels of the input image.

Further, the sub-task fusion block 308 performs a channel-wise fusion of the semantic information and the color correlation information. In an embodiment the sub-task fusion block 308 performs a Hadamard transformation between respective pixels of each of the channels from the semantic information and each of the channels from the color correlation information. Further the sub-task fusion block 308 generates learned maps between the semantic information and the color correlation information for each of the channels based on the Hadamard transformation. The learned maps between the semantic information and the color correlation information for each of the channels based may be generated by other methods known in art.

In an embodiment the sub-task fusion block 308 is realized as a simple dot product of the semantic and color correlation information. The computation mechanism for dot product is very efficient because of data locality. This sub-task fusion block 308 helps the proposed imaging device 200 to achieve better accuracy over the conventional imaging device 200.

After performing the channel wise fusion by the sub-task fusion block 308, the image post processing block 310 predicts an image component based on the channel-wise fusion of the semantic information and the color correlation information. After predicting the image component, the output block 312 corrects the at least one input image based on the predicted image component. Further the output block 312 obtains the at least one output image based on the correction.

In an example embodiment, in a color correction case, the output from the sub-task fusion block 308 is sent to the post processing block 310 to predict the illumination of the RGB component. In another embodiment, where the input image has low-light, the processing block 310 generates a low light enhanced image.

Figure 3B:
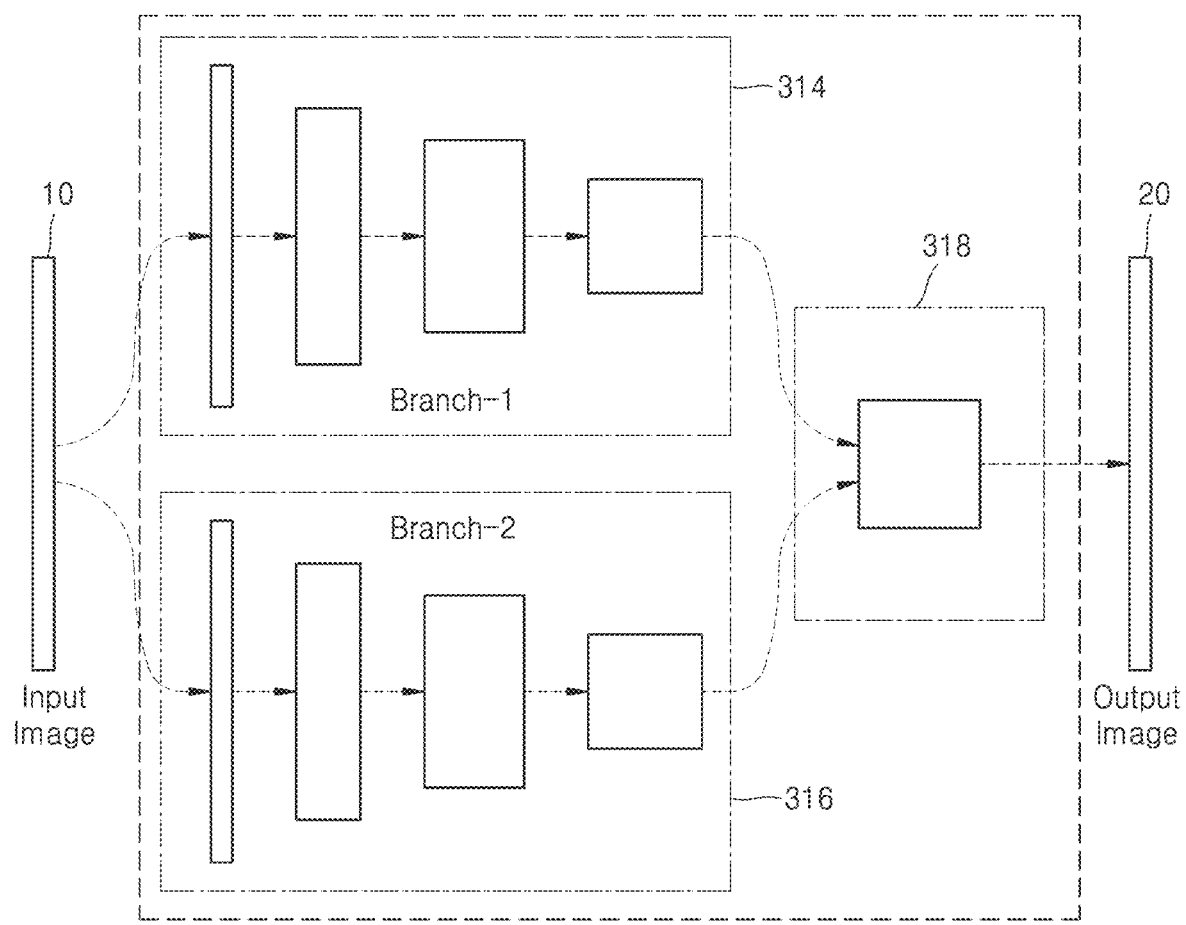
FIG. 3B is a schematic diagram, illustrating DNN-based imaging, according to the embodiments.

FIG. 3B is a schematic diagram, illustrating DNN-based imaging, according to the embodiments as disclosed herein.

In an example embodiment, the processor 210 extracts the semantic information and the color correlation information independently by using each separate neural network. In an example embodiment, each of the semantic information and the color correlation information is extracted in parallel from the input image 10.

As seen in FIG. 3B, in an example embodiment, at 314, the processor 210 extracts the semantic information from the input image 10 using a deep neural network comprising a Depth-Wise convolution operation. In an example embodiment, at 316, the processor 210 extracts the color correlation information from the input image 10 using a deep neural network comprising a point-wise convolution operation.

In an example embodiment, at 318, the processor 210 performs a channel-wise fusion of the extracted semantic information and the extracted color correlation information.

In an example embodiment, the processor 210 generates the output image 20 based on the extracted semantic information and the extracted color correlation information. The processor 210 generates the output image 20 based on the fusion of the semantic information and the color correlation information.

In an example embodiment, the processor 210 generates the output image 20 based on extracting independently the semantic information and the color correlation information from the input image 10 in parallel.

In another example embodiment, the processor 210 extracts another feature information from the input image. The processor 210 extracts at least two other feature information in parallel from the input image.

For example, the processor 210 extracts information regarding distribution of pixel values along a spatial dimension. Also, for example, the processor 210 extracts information regarding distribution of pixel values along a depth (channels) dimension. In an example embodiment, learning the distribution of pixel values across spatio-temporal or depth dimension may provide an intensity histogram of pixels. Also, learning the distribution of pixel values across spatio-temporal or depth dimension may provide a color constancy.

For another example, the processor 210 extracts information regarding statistical regularities across spatial dimension. Also, the processor 210 extracts information regarding statistical regularities across depth (channels) dimension. For example, the processor 210 extracts statistical properties such as mean, median, variance, skewness (asymmetry in the pixel value distribution), kurtosis (intensity peak in the pixel value distribution). In an example embodiment, learning the kurtosis may provide an amount of noise present in the input image.

For example, another feature information which is extracted by the processor 210 from the input image can be an information regarding capturing the dark channel feature. This feature may be used in de-hazing image. The dark channel of an image is defined as the minimum of all pixel colors in a local patch of an image. In most of the local regions which do not cover the sky, it is very often that some pixels (called "dark pixels") have very low intensity in at least one color (r, g, b) channel. For example, in the haze image, the intensity of these dark pixels in that channel is mainly contributed by the air light. Therefore, these dark pixels can directly provide an accurate estimation of the haze's transmission. This can be performed in the first branch of the proposed architecture.

For example, feature information can be information regarding estimating the atmospheric light feature. This feature may be used in de-hazing an image. The top brightest pixels in the dark channel may be estimated. These pixels are most haze opaque. Among these pixels, the pixels with highest intensity in the input image are selected as the atmospheric light. This can be performed in the second branch of the proposed architecture.

For example, feature information can be information regarding salient features in an image. This feature may be used in de-blurring an image. To detect the important portions in an image, the foreground may be segmented from the background. The blurred portions (background) and non-blurred (foreground) portions in an image may be detected and classified. This can be performed in the first branch of the proposed architecture.

For example, feature information can be information regarding motion vectors or optical flow estimation. This feature may be used in de-blurring image. The motion vectors are used to determine the optical flow, which estimates the motion and its direction. This is used to compensate the motion (object or camera motion) which causes blur in an image. This can be performed in the first branch of the proposed architecture.

For example, feature information can be information regarding estimating the kurtosis. This feature may be used in de-noising image. By estimating the pixel distribution present in an image and estimating the intensity peak in the pixel value distribution, the amount of noise may be estimated and the noise present in an image can be modeling. This is performed in both the branches of the proposed architecture.

For example, feature information can be information regarding pixel distribution. This feature may be used in color-correction and low-light image. The pixel intensity distribution across the R, G, B channels in an image can be captured. It gives the estimation of whether the information present in the image is too bright or too dark. Also, the illumination and noise can be modeled using the histogram generated from the pixel distribution. This is performed in the first branch of the proposed architecture.

In an embodiment, the processor 210 generates the output image based on extracting at least two other feature information from the input image in parallel.

Figure 4A:
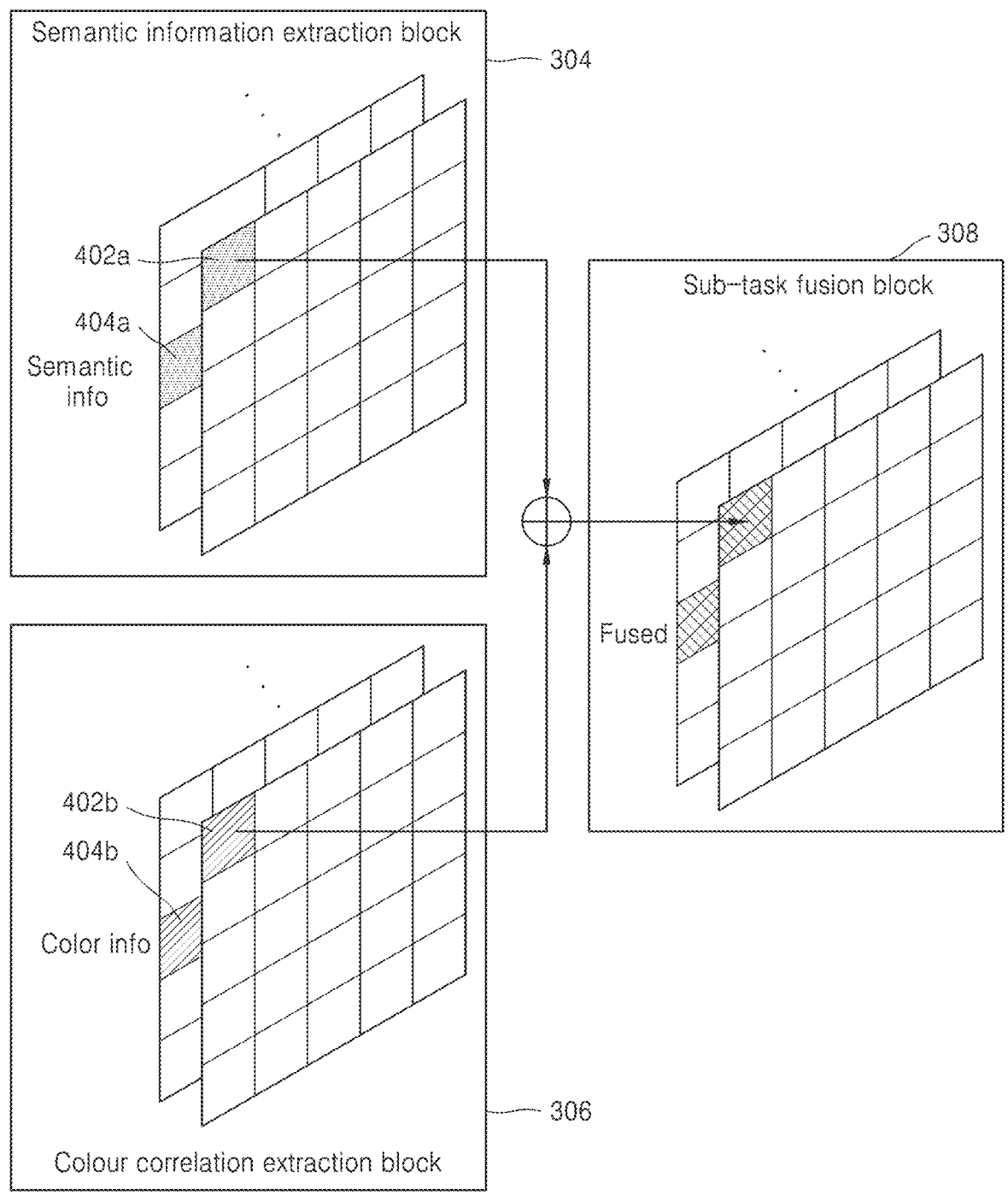
FIG. 4A is a block diagram, illustrating the fusion block operation, according to embodiments.

FIG. 4A is a schematic diagram, illustrating the functioning of the sub-task fusion block 308. As seen in FIG. 4A, at the semantic information extraction block 304, the semantic information is extracted from the plurality of channels of the input image.

In an example embodiment, from input image, after extracting semantic and color correlation information, for example, two output feature maps (semantic feature map and color feature map, each having "N" channels) are generated.

Two output feature maps have multiple channels. For example, the semantic feature map (extracted from first branch) has "N" channels. Similarly, the color feature map (extracted from second branch) has "N" channels.

In an example embodiment, for example, as seen in FIG. 4A, 402a and all pixels on that plane are channel-1 of semantic information. 402b and all pixels on that plane are channel-1 of color correlation information. For example, as seen in FIG. 4A, 404a and all pixels on that plane are channel-2 of semantic information. 404b and all pixels on that plane are channel-2 of color correlation information.

402 represent a first depth channel of the plurality of depth channels of the input image. Further 402a represents the semantic information extracted from the first depth channel and 402b represents the color correlation information extracted from the first depth channel. 404 represent at least one second depth channel of the plurality of depth channels of the input image. Further 404a represents the semantic information extracted from the at least one second depth channel in the plurality of channels of the input image and Further 404b represents the color correlation information extracted from the at least one second depth channel in the plurality of channels of the input image.

In an example embodiment, 402a and 404a are semantic feature blocks for different pixel portions in their respective feature maps. 402b and 404b are color feature blocks for different pixel portions in their respective feature maps. 402a and 402b are fused with (+) operator to get fused output at the respective portion as shown in sub-task fusion block 308. 404a and 404b in the second feature map are fused to get the respective portions in the sub-task fusion block 308. The Fusion operator (+) in the channel wise fusion block as in FIG. 4A, can take multiple formulations such as addition, multiplication, bitwise-OR-NOR-XOR etc.

The sub-task fusion block 308 fuses the extracted semantic information 402a with the extracted color correlation information 402b by performing a Hadamard transformation. In an embodiment the extracted semantic information 402a can be fused with the extracted color correlation information 402b by performing various techniques known in art. Further, the extracted semantic information 404a is fused with the extracted color correlation information 404b by the sub-task fusion block 308. This process is repeated by the sub-task fusion block 308 for the plurality of channels of the input image.

Figure 4B:
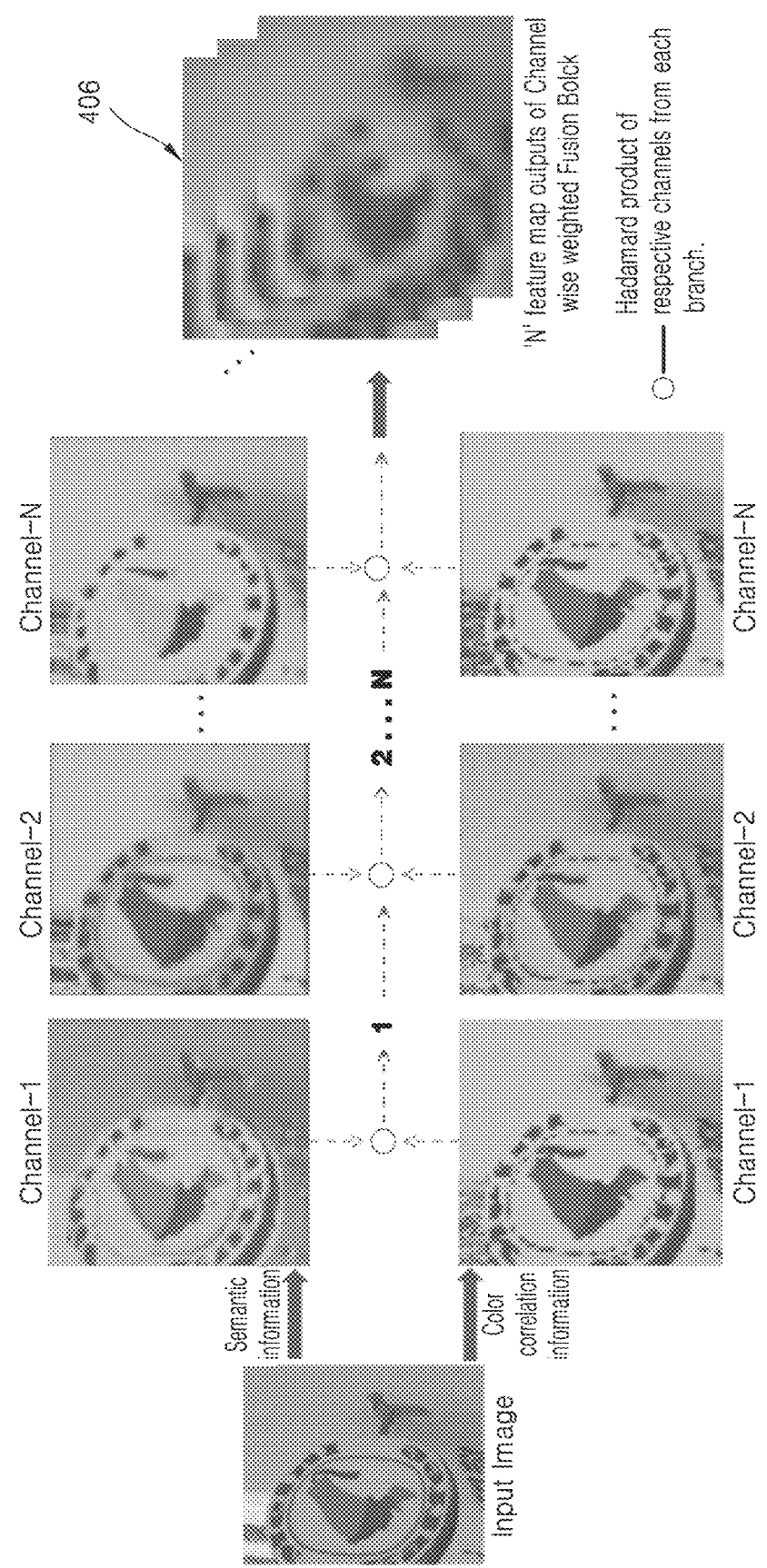
FIG. 4B is a schematic diagram, illustrating the fusion block operation, according to embodiments.

FIG. 4B is a schematic diagram, illustrating the fusion block operation.

As seen in FIG. 4B, in an embodiment the sub-task fusion block 308 generates a plurality of learned maps 406 between the semantic information and the color correlation information for each of the channels (Channel-1, Channel-2, - - - , Channel-N) based on the Hadamard transformation. The plurality of learned maps are fused together by the sub-task fusion block 308 to generate an image component for the at least one input image. In an embodiment, the sub-task fusion block 308 may generate the plurality of learned maps between the semantic information and the color correlation information for each of the channels based on the existing techniques known in art.

As seen in FIG. 4B, in an embodiment, in order to apply the semantic features (from branch-1) on the color features (from branch-2), a pooling technique called "channel-wise weighted pooling" can be used. The proposed channel-wise weighted pooling does not constraint the number of weighting filter to one, instead it provides semantic filters for each color correlation information extracted. In an embodiment, at least one of filters generated by semantic information extraction block is applied on at least one of color correlation information extracted from color correlation extraction block.

Also, the number of color correlation information extracted can be more than three which is later reduced to match the required output channel dimension.

In an embodiment, one or more semantic filters corresponding to each of the depth channels are generated. One or more color correlation information corresponding to each of the depth channels are extracted. Each of the one or more semantic filters is fused with the color correlation information corresponding to each of the depth channels.

According to an embodiment, channel-wise multiplication can make fine-tuning possible and results in better performance.

Figure 5A:
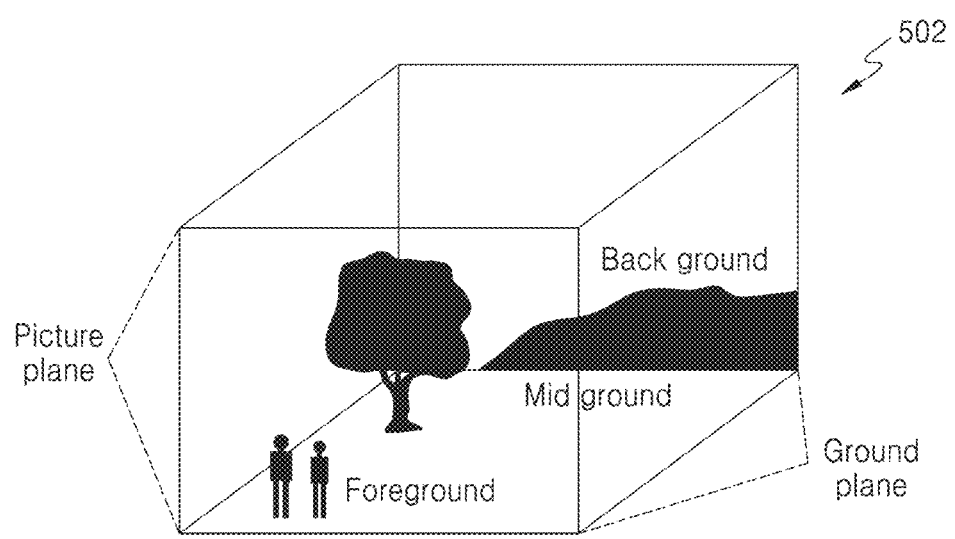
FIG. 5A is a schematic diagram, illustrating a semantic data in an input image, according to embodiments.

FIG. 5A is a schematic diagram, illustrating an example input image comprising the semantic information and the color correlation information according to an embodiment as disclosed herein. The image 502 is an example input image. The semantic information in an image spans spatially across the entire image and the pixel wise colour information spans across the depth (R, G, B colour channels) of the image. As seen in FIG. 5a a foreground, a background, an existence of an object in the image and relationship between multiple objects is determined which represents the semantic information of the image 502.

Figure 5B:
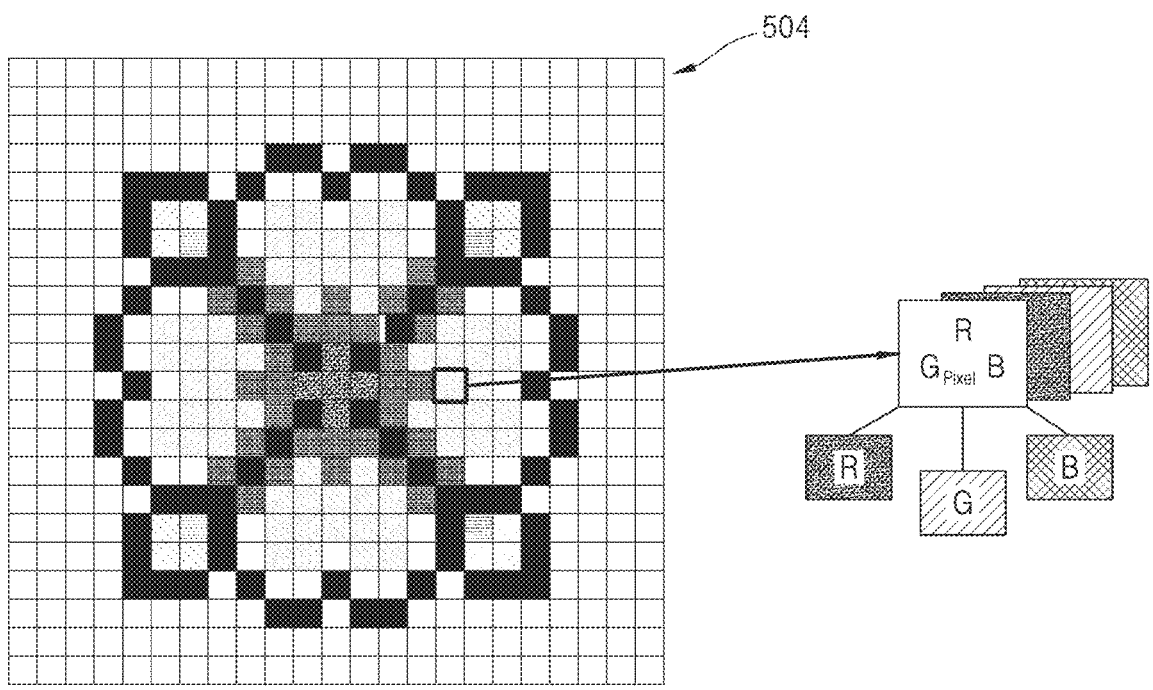
FIG. 5B is a schematic diagram, illustrating a color correlation data in the input image, according to embodiments.

FIG. 5B is a schematic diagram, illustrating an example input image comprising the color correlation information according to an embodiment as disclosed herein. The image 504 is an example input image. The pixel wise colour information spans across the depth (R, G, B colour channels) of the image 504. As seen in FIG. 5B the relationship between colour values in each channel is determined. Further the colour correlation information also represents the existence of independent pixels representing contrasting image related to the colour correlation information of the image 504.

Figure 6A:
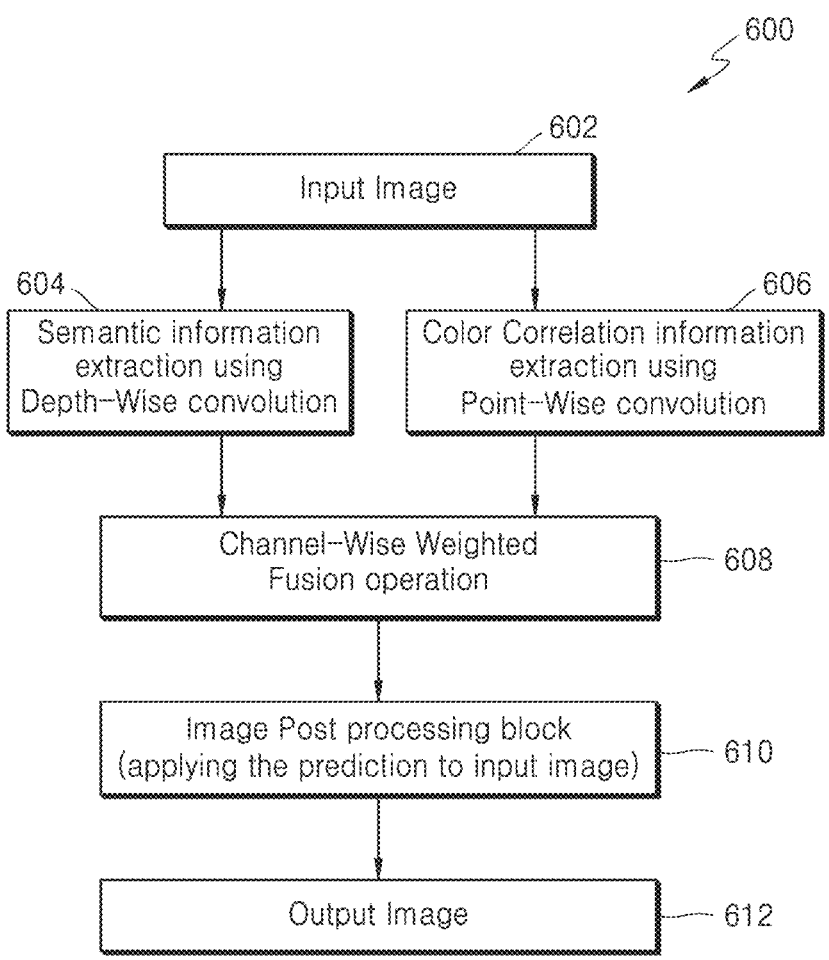
FIG. 6A is a flow diagrams illustrating a method for DNN-based training of the imaging device to embodiments.

FIG. 6A is a flow diagram 600, illustrating the method for DNN-based training of the imaging device to the embodiments as disclosed herein. At 602, the at least one input image from the plurality of input images is received by the imaging device 200. After receiving the at least one input image, at 604, the semantic information is extracted from the at least one input image by performing a depth-wise convolution on the at least one input image. At 606, the colour correlation information is extracted from the at least one input image by performing a point-wise convolution on the at least one input image. The steps 604 and 606 are performed simultaneously by the imaging device 200 after receiving the input image. By performing the depth-wise and point-wise convolution operation simultaneously, the computations are reduced by 70 times as compared to conventional methods. Further the DNN model size is also reduced by 50 times when compared to state of the art methods. Thus, the proposed architecture very much suitable for real time Mobile Vision applications.

After extracting the semantic information and the colour correlation information from the at least one input image the flow 600 proceeds to 608.

At 608 the imaging device 200 performs a channel-wise weighted fusion operation for obtaining the image component for the at least one input image. In an embodiment the imaging device 200 produces a multi-scale contextual map and sends it to the decoder in the image post processing block 310.

At 610 the imaging device 200 decodes the multi-scale contextual map and combines the multi-scale contextual maps for reconstructing the at least one input image in an original resolution. At 612 the image processing device 200, produces an output image based on the correction at 610.

Figure 6B:
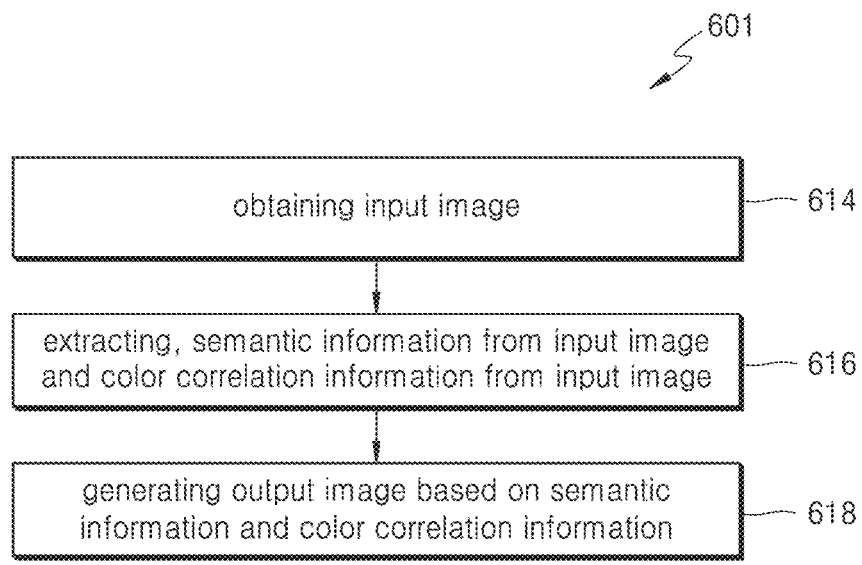
FIG. 6B is a flow diagrams illustrating a method of DNN-based image processing by the imaging device to embodiments.

FIG. 6B is a flow diagram 601, illustrating the method of DNN-based image processing by the imaging device to the embodiments as disclosed herein.

At 614 the imaging device 200 obtains input image. In an embodiment, the imaging device 200 obtains at least one input image with a plurality of color channels.

For example, the imaging device 200 obtains at least one image using a camera comprised in the imaging device 200. For example, the imaging device 200 receives at least one image from an external device. For example, the imaging device 200 obtains at least one image which is stored in the memory 220 as the input image.

At 616 the imaging device 200 extracts a semantic information from input image and a color correlation information from input image. In an embodiment, the imaging device 200 simultaneously extracts the semantic information from each of the color channels of the at least one input image and the color correlation information from each of the color channels of the at least one input image.

In an embodiment, the imaging device 200 performs a channel-wise fusion of the semantic information and the color correlation information.

At 618 the imaging device 200 generates output image based on the extracted semantic information and the extracted color correlation information.

Figure 7:
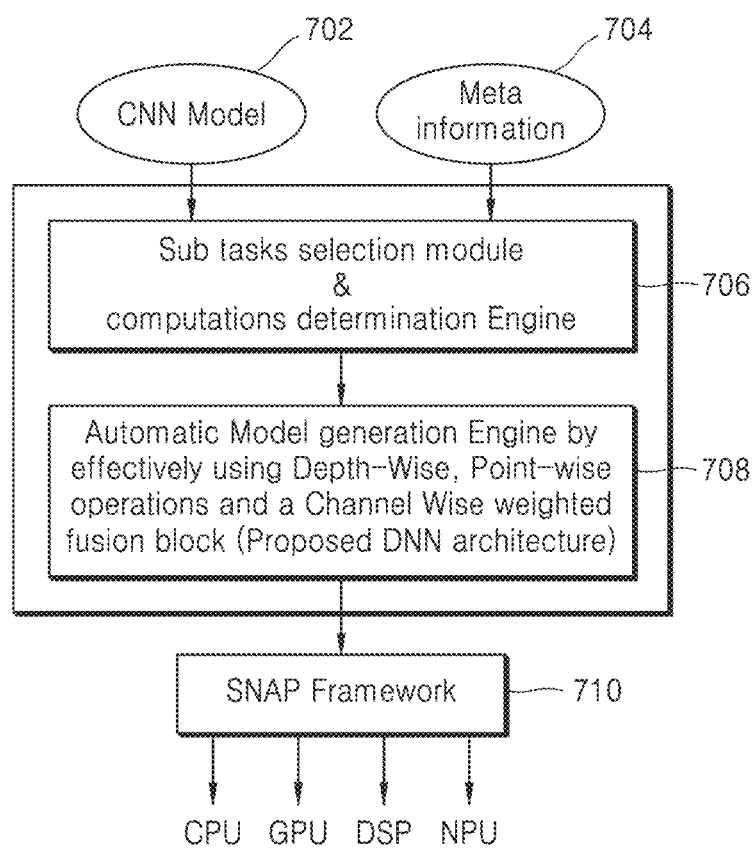
FIG. 7 is a schematic diagram, illustrating a method for converting any given generic CNN based model into the proposed DNN-based imaging device, according to embodiments.

In an embodiment, the imaging device 200 generates output image based on the channel-wise fusion of the semantic information and the color correlation information. FIG. 7 is a schematic diagram, illustrating a method for converting any given generic CNN based model into the proposed DNN-based imaging device 200.

As seen in FIG. 7, 702 is an existing CNN model. However, the existing CNN model is not effective as proposed DNN-based model shown in FIG. 3. As seen in FIG. 7, 704 is a Meta data information corresponding to the at least one input image. Further, at block 706 a subtask selection module is determined. The subtask selection module decides and splits the CNN computations to match the computation of the proposed DNN-based model shown in FIG. 3. In block 708 an automatic generation engine generates the effective CNN model by using Depth-Wise, Point-wise convolution operations and a Channel Wise weighted fusion block. Block 710 represents a SNAP framework of the effective CNN model comprising various elements such as a Central Processing Unit (CPU), a Graphics Processing Unit (GPU), a Digital Signal Processor (DSP) and a Neural Processing Unit (NPU).

Figure 8:
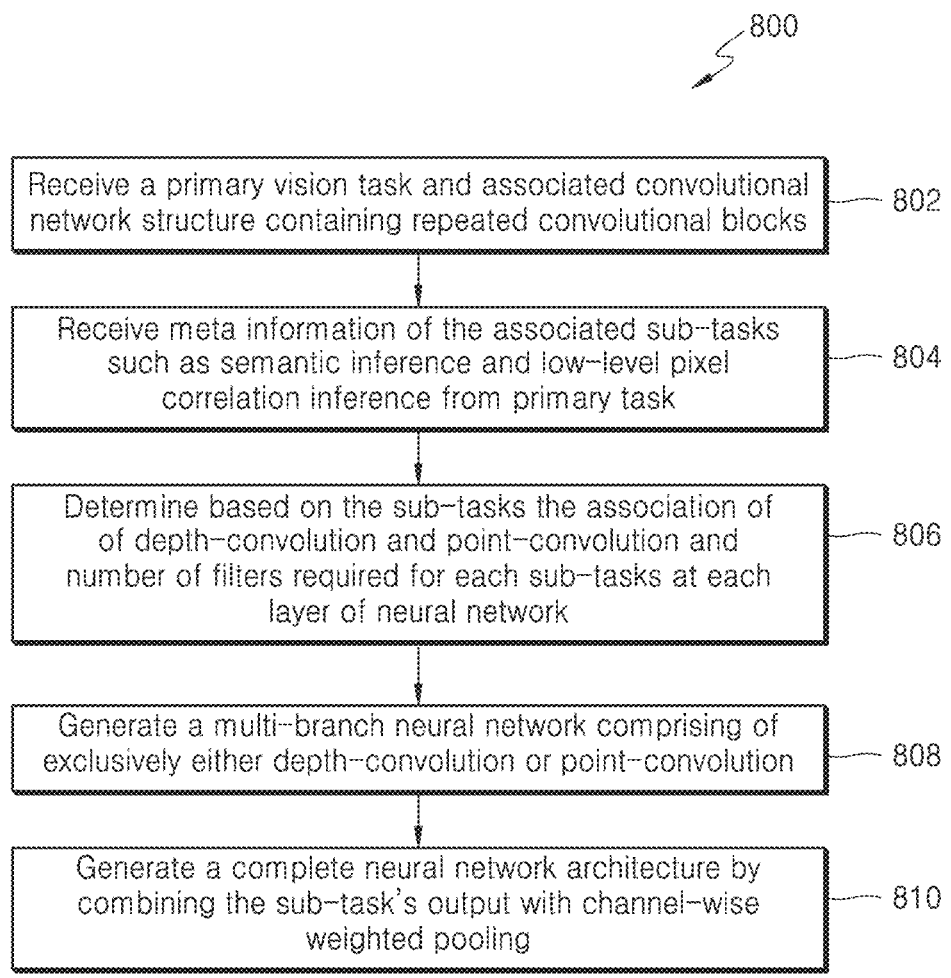
FIG. 8 is a flow, illustrating a method for converting any given generic CNN based model into the proposed DNN-based imaging device, according to embodiments.

FIG. 8 is a flow 800, illustrating a method for converting any given generic CNN based model into the proposed DNN-based imaging device 200. At 802 a primary vision task and associated convolution network structure containing repeated convolution blocks is received by the imaging device 200. Further at 804, the Meta information of the associated sub-tasks such as semantic inference and low-level pixel correlation inference from primary task is received by the imaging device 200. At 804, the imaging device 200 determines the number of filters required for each sub-task at each layer of neural network and the association of depth-convolution and point-convolution based on the sub-tasks. At 806, based on the sub-tasks, the association of the depth-convolution an point convolution and a number of filters required for each sub-tasks at each layer of neural network is determined. At 808, a multi-branch neural network is generated by the imaging device 200 comprising of exclusively either depth-convolution or point-convolution. At 810 complete neural network architecture is generated by combining the sub-task's output with channel-wise weighted pooling.

Further by leveraging the SNAP capabilities, additional speed-up on can be achieved which makes the proposed DNN model very much suitable for very high FPS real time Mobile Vision applications like: Video de-blurring, Video color correction, High FPS low light video recording.

Figure 9:
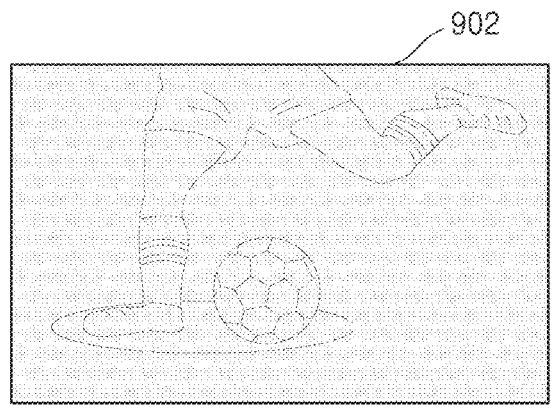
FIG. 9 is a diagram illustrating an exemplary hazy image, a de-hazed image using conventional methods, and a de-hazed image using the proposed method, according to the embodiments.
Figure 9:
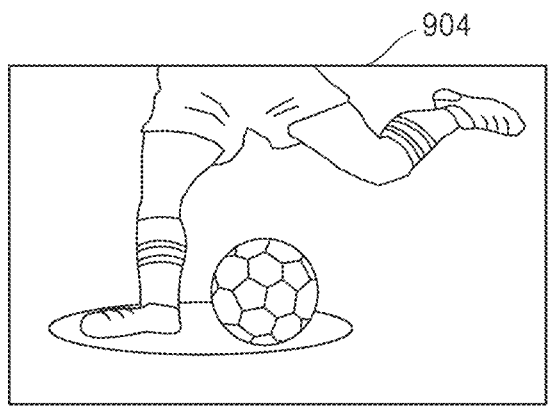
Figure 9:
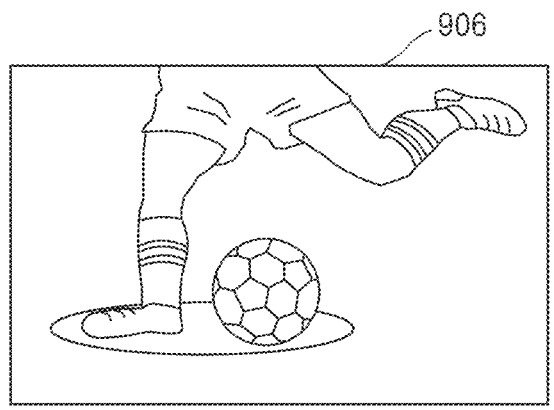

FIG. 9 is a diagram illustrating an exemplary hazy image, a de-hazed image using conventional methods, and a de-hazed image using the proposed method. As seen in FIG. 9, 902 represents the exemplary hazy image, 904 is the de-hazed image using conventional methods, and 906 is the de-hazed image using the proposed method. The image de-hazing 904 is performed by existing heavier DNN models. The existing DNN models when run on mobile platform faces frame drops due to more computational complexity and thus results in a bad user experience. Further the existing DNN models also occupy more memory and causes memory overhead.

The image de-hazing 906 is performed by a proposed lighter & faster DNN model. The proposed model when run on mobile platform does not face any frame drop as the proposed method has much less computational complexity. Further the proposed method also occupies less memory, almost thirty times lesser than the existing methods.

Figure 10A:
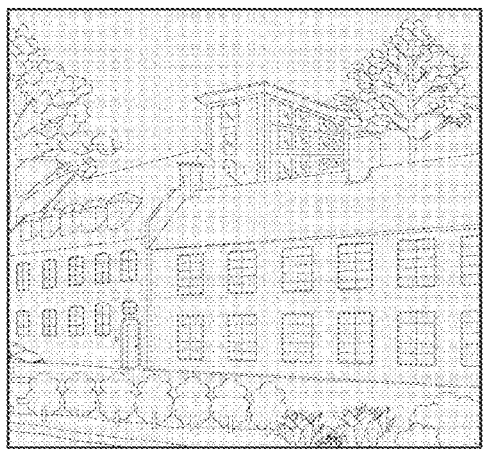
FIG. 10A illustrates exemplary input image to the imaging device, according to embodiments.
Figure 10B:
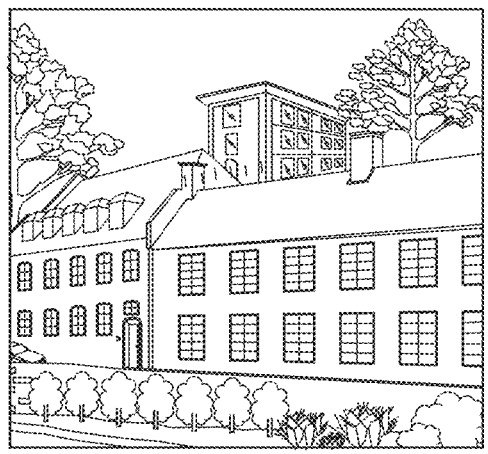
FIG. 10B illustrates exemplary output image from the imaging device, according to embodiments.
Figure 10C:
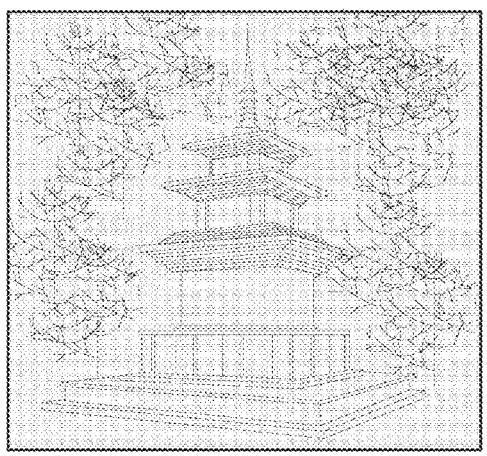
FIG. 10C illustrates exemplary input image to the imaging device, according to embodiments.
Figure 10D:
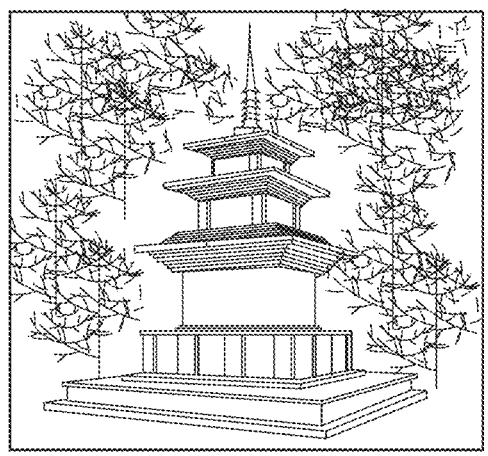
FIG. 10D illustrates exemplary output image from the imaging device, according to embodiments.
Figure 10E:
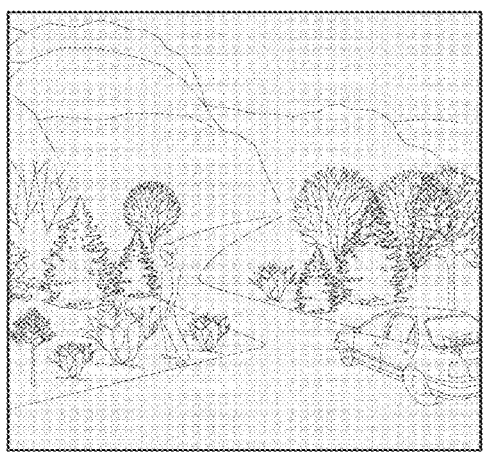
FIG. 10E illustrates exemplary input image to the imaging device, according to embodiments.
Figure 10F:
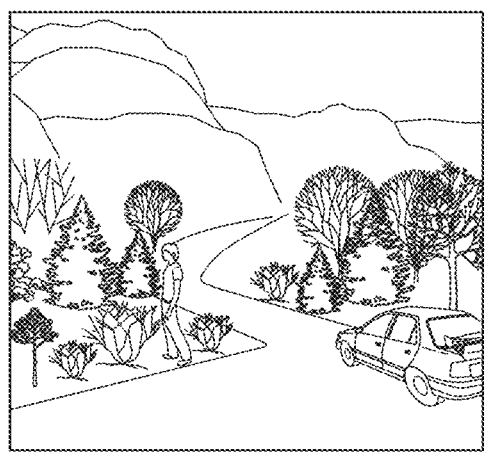
FIG. 10F illustrates exemplary output image from the imaging device, according to embodiments.

FIGS. 10A-10B illustrate an exemplary hazy image, and a de-hazed image using the proposed method respectively. FIGS. 10C-10D illustrate exemplary noisy images, and a de-noised image using the proposed method respectively. FIGS. 10E-10F illustrate an exemplary blurry image, and a de-blurred image using the proposed method, respectively.

Figure 11:
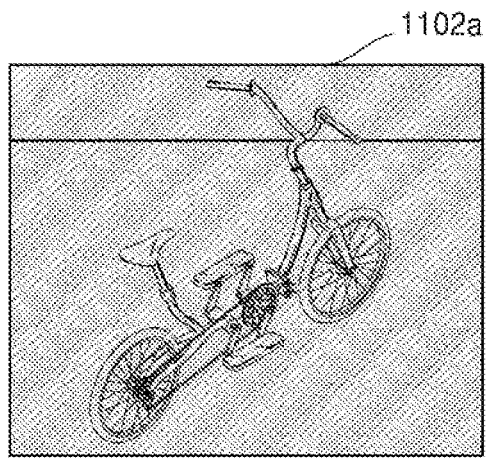
FIG. 11 is a diagram illustrating exemplary low light input images and enhanced output images using the proposed method, according to an embodiment.
Figure 11:
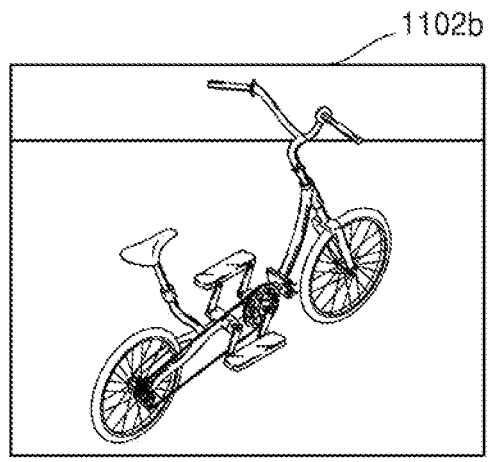
Figure 11:
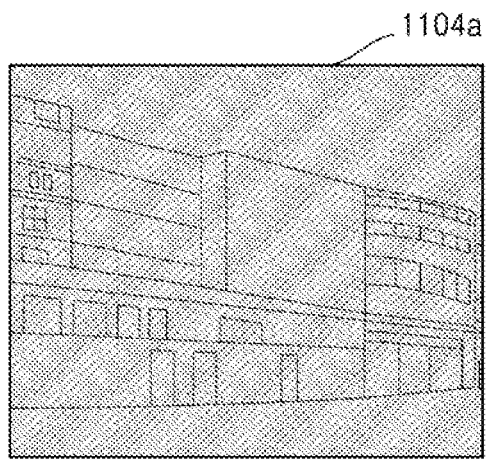
Figure 11:
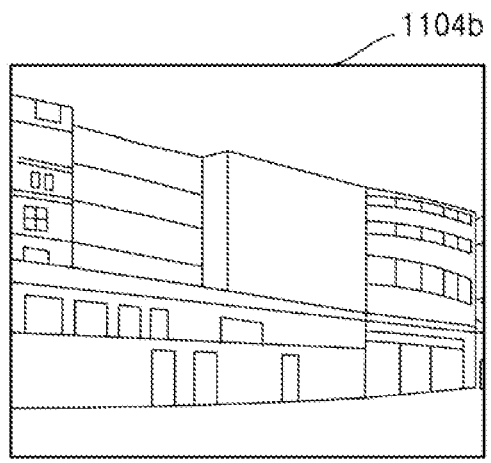
Figure 11:
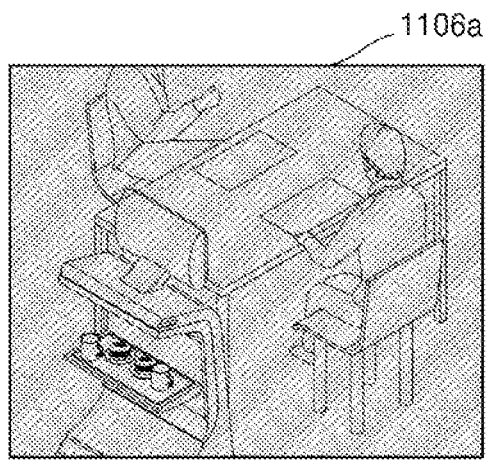
Figure 11:
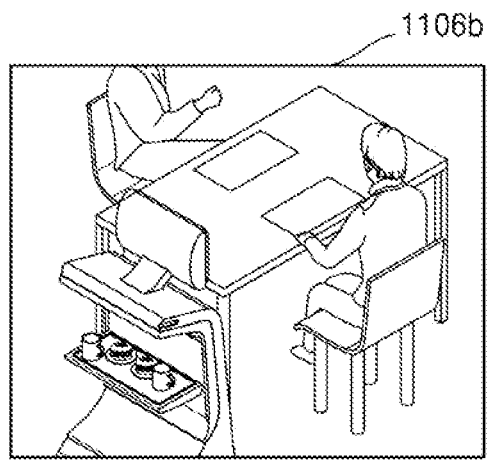

FIG. 11 is a diagram illustrating exemplary low light input images and enhanced output images using the proposed method, according to an embodiment as disclosed herein. As shown in FIG. 11, images 1102a, 1104a and 1106a are the low light input images for the imaging device 200. Images 1102b, 1104b and 1106b are the corresponding enhanced output images from the imaging device 200, using the proposed method. As seen from images 1102b, 1104b and 1106b, it is understood that the proposed method transforms very Low-Light images into best quality natural images.

Figure 12:
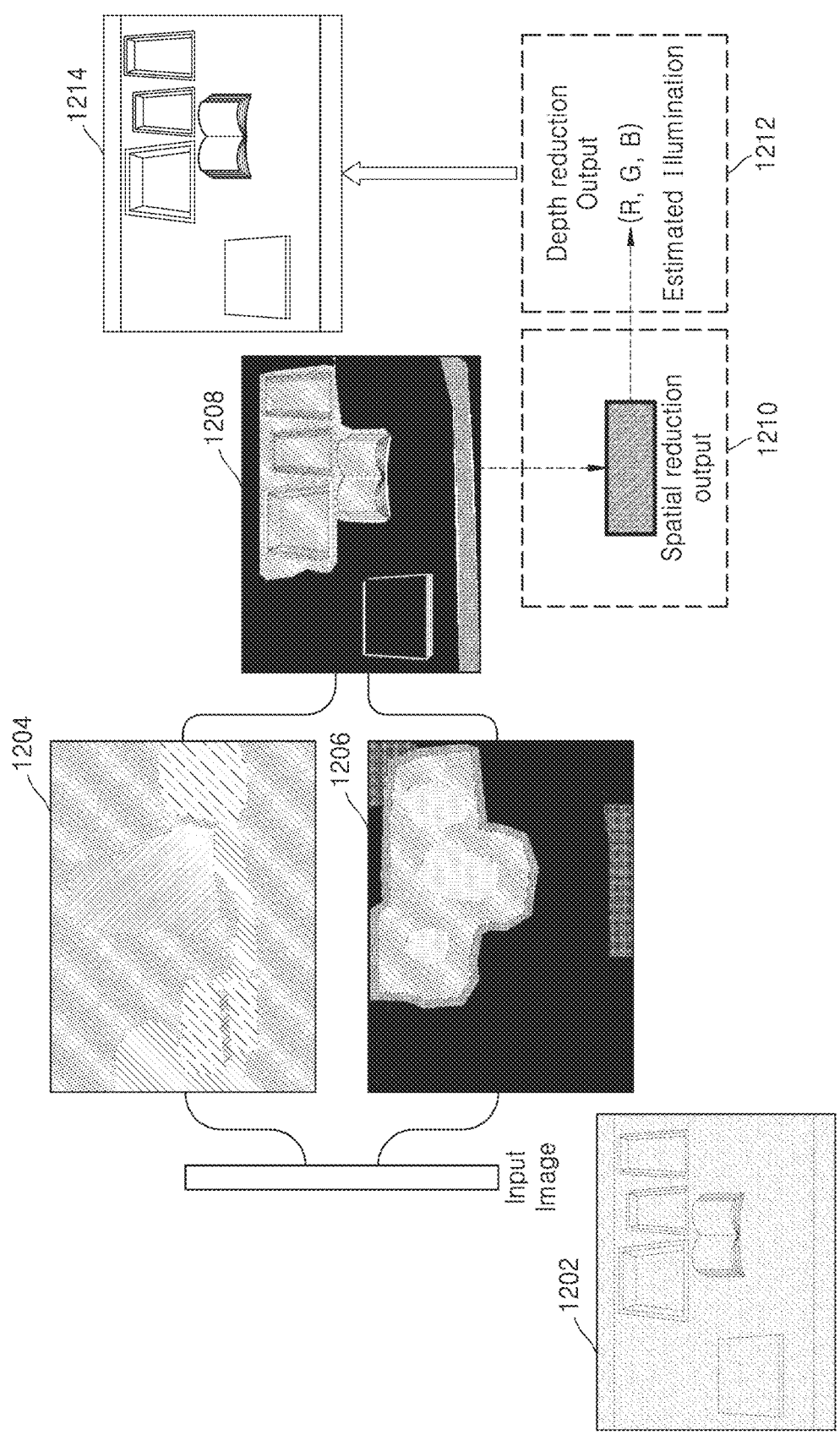
FIG. 12 is a diagram, illustrating an exemplary image color correction by the proposed method, according to an embodiment.

FIG. 12 is a diagram, illustrating image color correction of an example image by the proposed method, according to an embodiment as disclosed herein. As seen in FIG. 12, 1202 is the input image to the imaging device 200. At 1204, the imaging device 200 learns about the relevant color information across the input image 1202 by performing the point-wise convolution operation on the input image 1202. At 1206, the imaging device 200 learns which pixels are important to estimate illumination and assigns priority for them accordingly using the depth-wise convolution operation on the input image. At 1308, the imaging device 200 fuses the output obtained from 1204 and 1206 using a channel wise weighted pooling layer. At 1210, the imaging device 200 performs a spatial reduction on the output obtained at 1208. In an embodiment, at 1210, the dimension of the output obtained at 1208 is reduced to match the dimension of the required prediction. At 1212, a depth reduction output is obtained by subtracting the output color from 1210 from the input image 1202 to obtain a color corrected image 1214.

Figure 13:
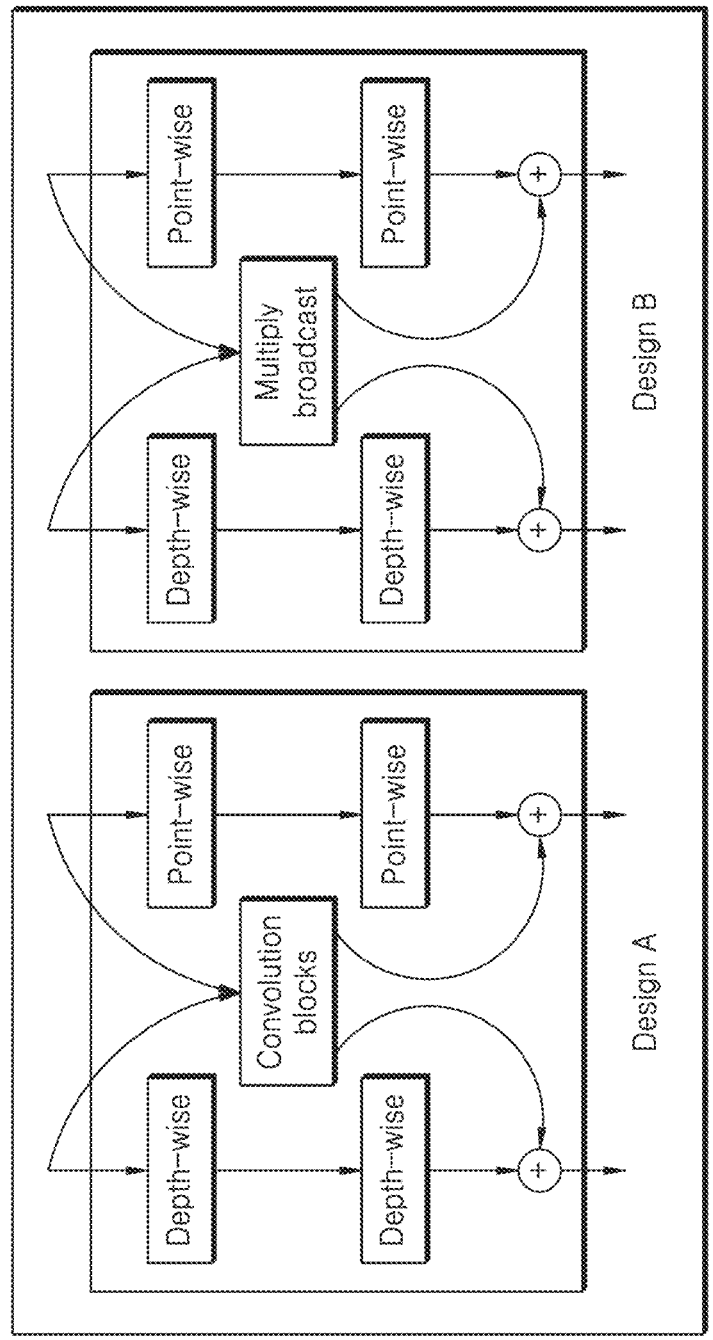
FIG. 13 is a diagram, illustrating architecture with two design blocks for achieving greater accuracy for image processing, according to an embodiment.

FIG. 13 shows a schematic diagram, illustrating architecture with two design block for achieving greater accuracy, according to an embodiment as disclosed herein. The architecture shown in FIG. 13 comprises two design blocks for processing the input image. As seen in FIG. 13, for design A the fusion operation of the point-wise convolution and depth wise convolution is performed using convolution blocks. Design A convolves on concatenated task specific inputs. For design B, the fusion operation of the point-wise convolution and depth wise convolution is performed using multi-broadcast block. Design B uses the channel-wise weighted pooling method to combine the input signals. In an embodiment, in design B, the fusion operation may be performed using Hadamard transformation. The architecture shown in FIG. 13 provides greater accuracy for processing the input image.

Figure 14:
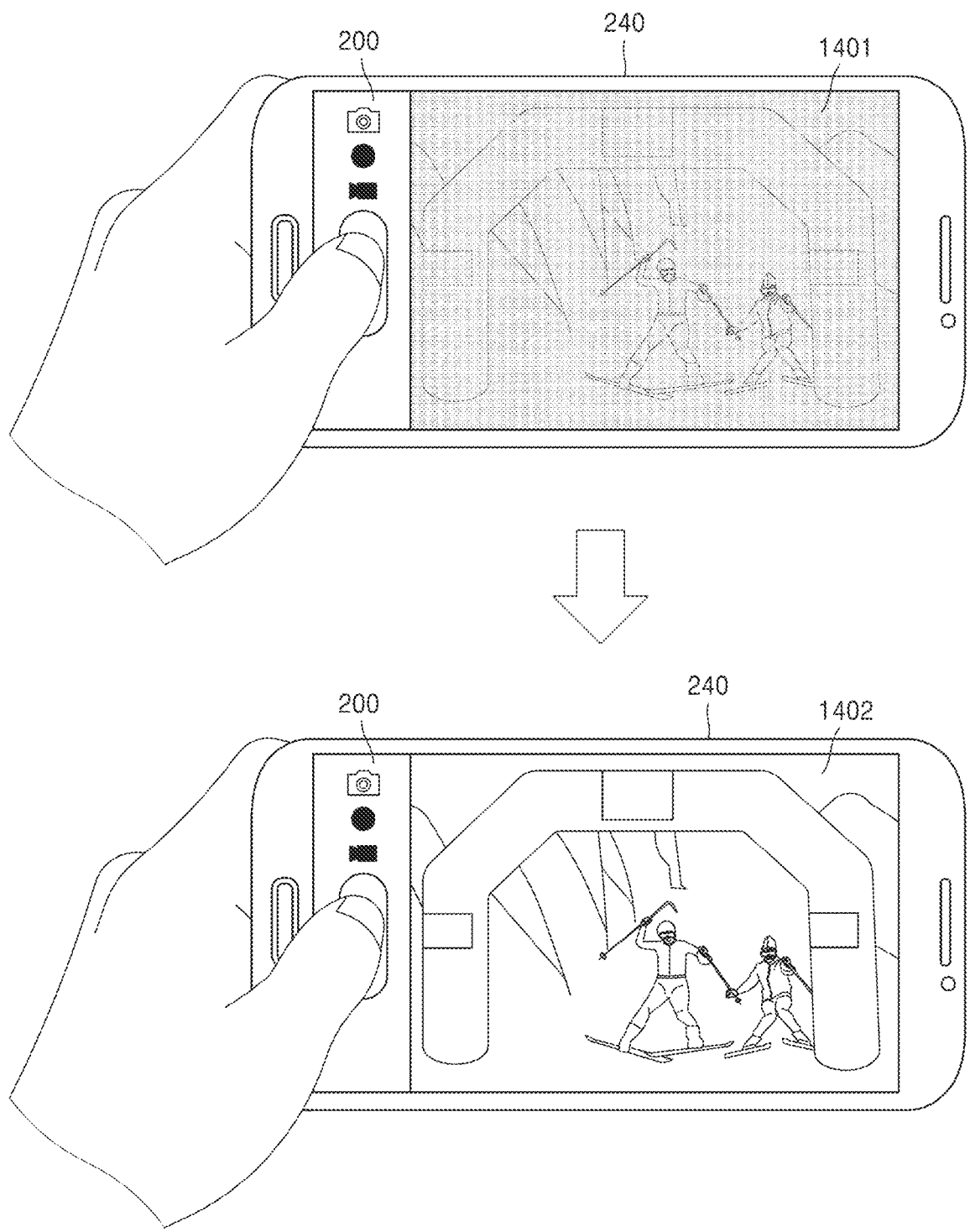
FIG. 14 is a diagram, illustrating exemplary input image captured by using a camera and enhanced output images using the proposed method, according to an embodiment.

FIG. 14 is a diagram illustrating exemplary input image captured by using a camera and enhanced output images using the proposed method, according to an embodiment as disclosed herein.

In an embodiment, the imaging device 200 comprises at least one camera (not shown). In an embodiment, the imaging device 200 further comprises a display 240.

As seen in FIG. 14, in an embodiment, the processor 210 controls the at least one camera to capture an image based on an user input. The processor 210 controls the display 240 to display the captured image 1401. For example, the captured image 1401 may be an image with a haze.

In an embodiment, the processor 210 generates the image 1402 without a haze from the image 1401 with a haze using the proposed method. In an example embodiment, the processor 210 obtains the captured image 1401 as an input image for image processing. The processor 210 generates the image 1402 of which the haze is removed and image quality is enhanced as an output image.

As seen in FIG. 14, the processor 210 controls the display 240 to display the image 1402 without a haze.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of DNN-based image processing by an imaging device, the method comprising:
    obtaining, by the imaging device, at least one input image with a plurality of color channels;
    extracting, by the imaging device and through a first branch at a first resolution, a semantic information from each of the color channels of the at least one input image;
    extracting, by the imaging device and through a second branch at the first resolution, a color correlation information from each of the color channels of the at least one input image; and
    generating, by the imaging device, at least one output image having an image quality that is enhanced compared to the input image, based on the semantic information that was extracted through the first branch and the color correlation information that was extracted through the second branch.

2. The method of claim 1, further comprising performing, by the imaging device, a channel-wise fusion of the semantic information and the color correlation information.

3. The method of claim 2, further comprising generating one or more semantic filters corresponding to each of the color channels, and
    wherein the performing the channel-wise fusion comprises fusing each of the one or more semantic filters with the extracted color correlation information corresponding to each of the color channels.

4. The method of claim 2, wherein the performing the channel-wise fusion of the semantic information and the color correlation information comprises:
    performing, by the imaging device, a fusion of pixels of respective channels from the semantic information and the color correlation information for each of the channels; and
    generating, by the imaging device, learned maps between the semantic information and the color correlation information for each of the channels based on the fusion.

5. The method of claim 2, wherein the generating at least one output image comprises:
    generating predictions, by the imaging device, based on the channel-wise fusion of the semantic information and the color correlation information;
    correcting, by the imaging device, the at least one input image based on the predicted values generated from the channel-wise fusion operation; and
    generating, by the imaging device, the at least one output image based on the correction.

6. The method of claim 1, wherein the extracting the semantic information and the color correlation information comprises extracting the semantic information and the color correlation information independently by using a respectively separate neural network.

7. The method of claim 1, wherein the extracting the semantic information comprises extracting the semantic information by using Depth-Wise convolution.

8. The method of claim 1, wherein the extracting the color correlation information comprises extracting the color correlation information by using Point-Wise convolution.

9. An imaging device for DNN-based image processing, the imaging device comprising:
    a memory;
    a processor coupled to the memory and configured to:
        obtain at least one input image with a plurality of color channels;

extract, through a first branch at a first resolution, a semantic information from each of the color channels of the at least one image extract, through a second branch at the first resolution, a color correlation information from each of the color channels of the at least one image; and generate at least one output image having an image quality that is enhanced compared to the input image, based on the semantic information that was extracted through the first branch and the color correlation information that was extracted through the second branch.

10. The imaging device of claim 9, wherein the processor is further configured to perform a channel-wise fusion of the semantic information and the color correlation information.

11. The imaging device of claim 10, wherein the processor is further configured to generate at least one semantic filters corresponding to each of the color channels; and wherein the processor is further configured to fuse each of the at least one semantic filters with the extracted color correlation information corresponding to each of the color channels.

12. The imaging device of claim 10, wherein the processor is configured to generate prediction, based on the channel-wise fusion of the semantic information and the color correlation information;

correct the at least one input image based on the predicted values generated from the channel-wise fusion operation; and generate the at least one output image based on the correction.

13. The imaging device of claim 9, wherein the processor is configured to extract the semantic information and the color correlation information independently by using a respectively separate neural network.

14. The imaging device of claim 9, wherein the processor is configured to extract the semantic information by using Depth-Wise convolution.

15. The imaging device of claim 9, wherein the processor is configured to extract the color correlation information by using Point-Wise convolution.

16. The imaging device of claim 9, wherein the processor is configured to perform a fusion of pixels of respective channels from the semantic information and the color correlation information for each of the channels; and generate learned maps between the semantic information and the color correlation information for each of the channels based on the fusion.

17. A non-transitory computer-readable recording medium having an executable program recorded thereon, wherein the program, when executed by at least one processor, instructs a computer to perform:

obtaining, by an imaging device, at least one input image with a plurality of color channels;

extracting, by the imaging device and through a first branch at a first resolution, a semantic information from each of the color channels of the at least one input image;

extracting, by the imaging device and through a second branch at the first resolution, a color correlation information from each of the color channels of the at least one input image; and generating, by the imaging device, at least one output image having an image quality that is enhanced compared to the input image, based on the semantic information that was extracted through the first branch and the color correlation information that was extracted through the second branch.

* * * * *